ELECTRO-MAGNETIC TRANSDUCER

Filed Dec. 28, 1959 3 Sheets-Sheet 1

INVENTORS:
Maurice S. Martin
Alfred M. Nelson
By Smyth & Roston
Attorneys

Sept. 10, 1963 M. S. MARTIN ETAL 3,103,665

ELECTRO-MAGNETIC TRANSDUCER

Filed Dec. 28, 1959 3 Sheets-Sheet 2

INVENTORS:
Maurice S. Martin
Alfred M. Nelson
By Smyth & Roston
Attorneys,

ELECTRO-MAGNETIC TRANSDUCER

Filed Dec. 28, 1959

INVENTORS:
Maurice S. Martin
Alfred M. Nelson
By Smyth & Roston
Attorneys.

3,103,665
Patented Sept. 10, 1963

3,103,665

ELECTRO-MAGNETIC TRANSDUCER

Maurice S. Martin, Los Angeles, and Alfred M. Nelson, Redondo Beach, Calif., assignors to The Magnavox Company, Los Angeles, Calif., a corporation of Delaware Filed Dec. 28, 1959, Ser. No. 862,323
8 Claims. (Cl. 346—74)

The present invention relates to electro-magnetic transducers, and it relates more particularly to an electromagnetic transducer of the write head type which is especially adapted to write information on a magnetic information storage card. The invention also relates to a method of producing such electro-magnetic transducers.

The use of data processing systems has become widespread in recent years, and such systems have found utility in many different types of business organizations and in other areas. One known type of data processing system uses a multiplicity of discrete information storage cards. Binary data is recorded on each of these cards in the form of patterns of individually magnetized magnetic areas, and these areas represent either binary "0" or binary "1." Each of the magnetized areas represents a different binary bit which, in turn, represent different digits of numeric or alpha-numeric information recorded on the card.

In a practical embodiment of an information storage card of the type under discussion, the separate magnetized areas are arranged in a plurality of parallel rows extending lengthwise of the card. These magnetized areas, in accordance with the Manchester serial-serial method of recording, individually present a magnetic section of a first polarity and then a magnetic section of opposite polarity to a processing read head to provide a binary "1" indication. These areas also individually present a magnetic section of the opposite polarity followed by a section of the first polarity for a binary "0" indication.

When the magnetized areas on an information storage card are arranged in a plurality of parallel rows extending lengthwise of the card, as mentioned above, the magnetized areas of each row may be successively scanned by a corresponding one of a plurality of electro-magnetic read heads. Each read head produces, in response to such scanning, electrical output signals which have particular characteristics for the binary "1's" and different characteristics for the binary "0's."

Pursuant to one particular recording program, the numeric or alphanumeric characters are recorded in each row of the information storage card in a series of groups of magnetized areas. Each of these groups includes, for example, eight magnetized areas. The first area in each group is magnetized in a particular manner and functions as a "guard" bit. The next six areas in the group are magnetized in the manner described above to constitute six binary bits of data of different significance which form the corresponding numeric or alphanumeric character. The last magnetized area in each group constitutes the party bit.

The present invention is concerned with an improved and unique electro-magnetic write head which is especially useful for recording information on information storage cards of the type discussed in the preceding paragraphs. For practical purposes, it is required that the information storage cards individually exhibit a high capacity for receiving information to be recorded. This is to permit a relatively large amount of data to be recorded on each card. This requires extremely high density in the magnetized areas on the card, which in turn has created recording problems.

An important objective of the present invention is to provide an electro-magnetic transducer head which is capable of recording multi-digit characters on a recording medium, such as an information storage card. Another objective is to provide an electro-magnetic transducer head which is capable of carrying out such recording in a manner compatible with the high density requirements of the usual information storage card.

The embodiment of the invention to be described consists of a write head transducer of the electro-magnetic type for the serial-serial Manchester method of recording. The write head of the embodiment of the invention to be described is capable of recording each 8-bit character simultaneously. The recording provided by the improved transducer of the invention is compatible with the high density requirements of the information storage card. The usual prior art transducers are not suitable for this application because of the extremely close spacing of the bits making up each character to be recorded on the card.

The embodiment of the invention to be described includes a thin strip or panel of insulating material which supports a plurality of printed conductors. These conductors have narrow sections extending in spaced parallel relationship across an edge of the panel. It is this edge which forms the active face of the transducer. The narrow sections of the conductors are arranged in interconnected pairs. Each pair includes a first section which carries current in one direction and a second section which carries current in the reverse direction. These pairs are suited for the Manchester serial-serial method of recording. Such recording may produce a binary "1" or a binary "0," by controlling the polarity of the voltage introduced across each pair.

The insulating strip and printed conductors are made into a replaceable element in accordance with another aspect of the invention. The replaceable element is held in the transducer head by pressure means, and suitable electrical contact is established between the element and the electric terminals of the head. With a construction such as described in the preceding paragraph, field servicing is facilitated. It is merely necessary for servicing that the worn or damaged element be removed and a new element be slipped into place in the supporting assembly.

In the drawings:

FIGURE 1 is a fragmentary enlarged diagrammatic showing of an information storage card, illustrating the manner in which numeric or alphanumeric characters may be recorded on the card;

FIGURE 1*a* is a further diagrammatic showing of the manner in which binary information may be recorded in adjacent areas on the card;

Figures 3, 4:
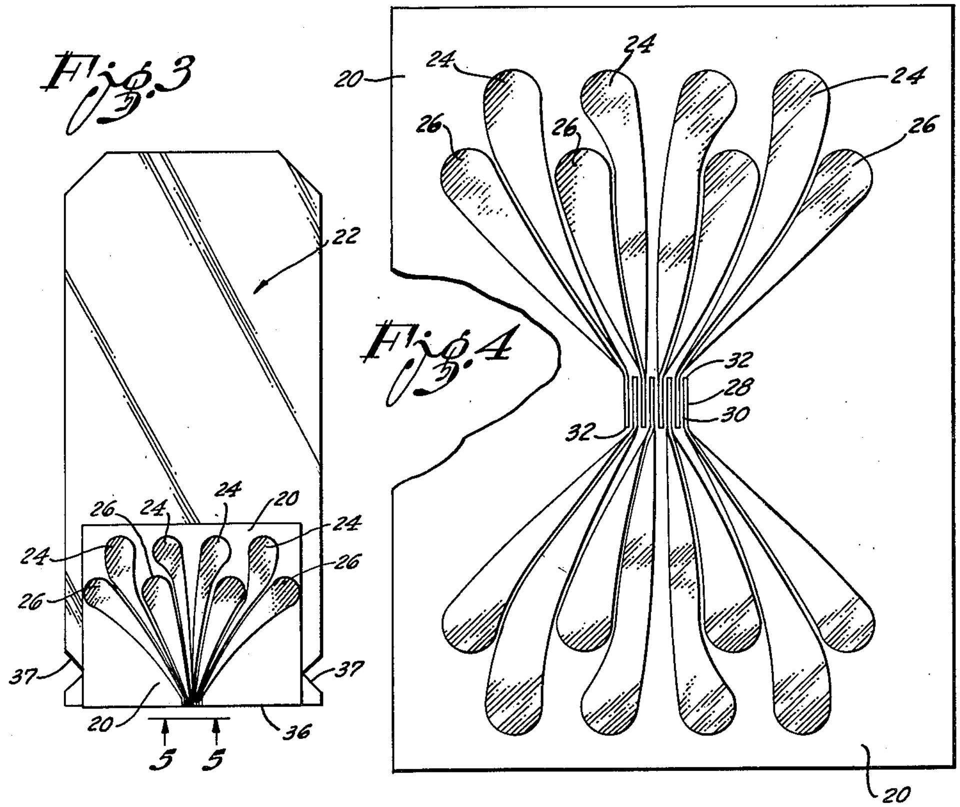
FIGURE 3 is a side elevational view of a write head element constructed in accordance with the invention, the element including a supporting panel and a plurality of printed electrical conductors each having a section extending across an edge of the panel to form an active transducer surface.
FIGURE 4 is an enlarged view of the printed circuitry of FIGURE 3, and showing the printed circuitry supported on a flexible insulated plastic film, which film is cemented or otherwise attached to the panel in FIGURE 3 so that narrow sections of the printed circuit conductors may extend across the active edge of the assembly.
Figure 5:
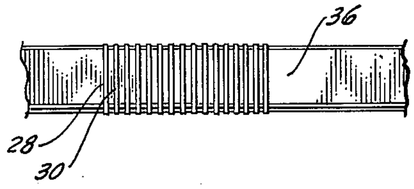
FIGURE 5 is an enlarged fragmentary view of a portion of the active transducer edge of the head in FIGURE 3, taken substantially along the line 5—5, the latter view showing the manner in which pairs of current-carrying sections extend in spaced relationship across that edge to form the transducer elements.
Figure 5A:
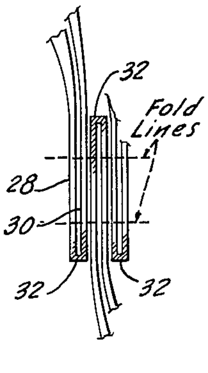
Figures 6, 7:
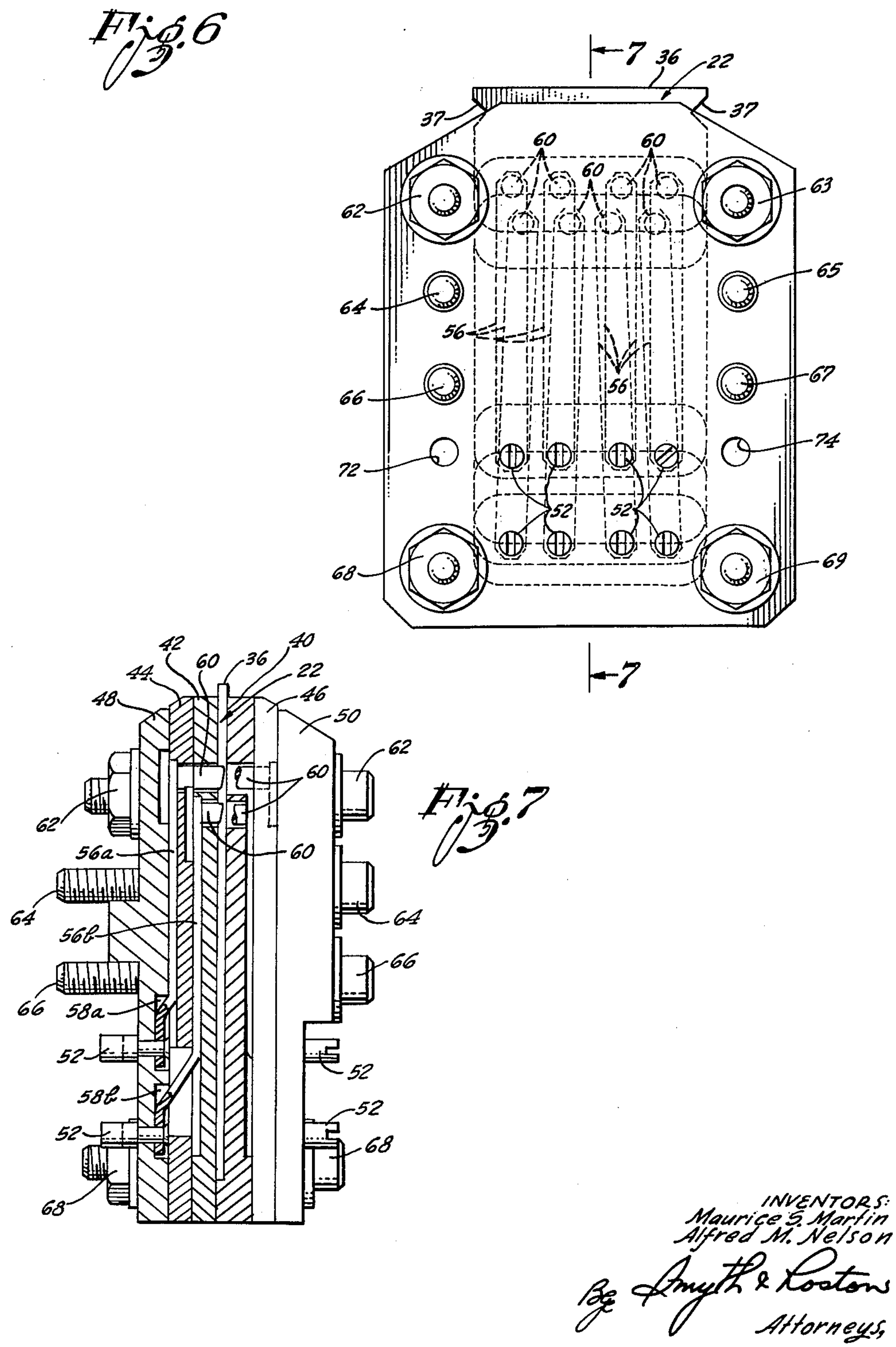

FIGURE 5*a* is an enlarged fragmentary view of the center portion of the printed circuitry of FIGURE 4, showing more clearly the configuration of the narrow sections of the printed circuit conductors;

FIGURE 6 is an enlarged side view of a transducer assembly which is constructed to support the transducer element of FIGURE 3, the assembly including terminal and connecting means, the connecting means being held in electric contact with the transducer element, and the element being removable for replacement purposes; and FIGURE 7 is a sectional view substantially on the line 7—7 of FIGURE 6 and illustrates the manner in which resilient electrical connecting means extend from a plurality of terminals in the supporting housing to the respective terminals of the transducer element to be held in contact with the latter terminals by the housing.

Figure 1:
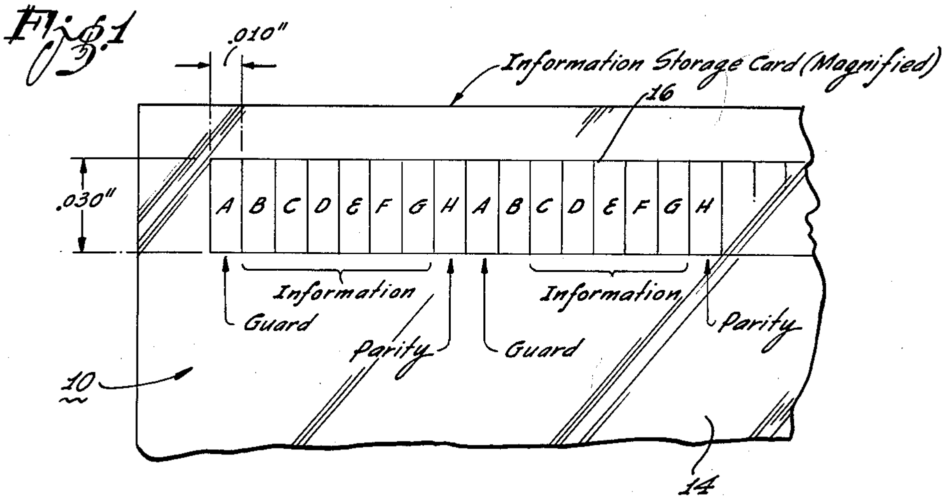
Figure 1A:
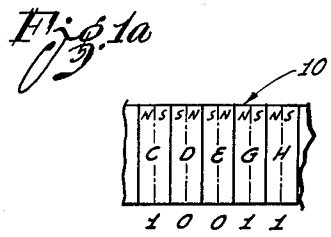
Figure 2:
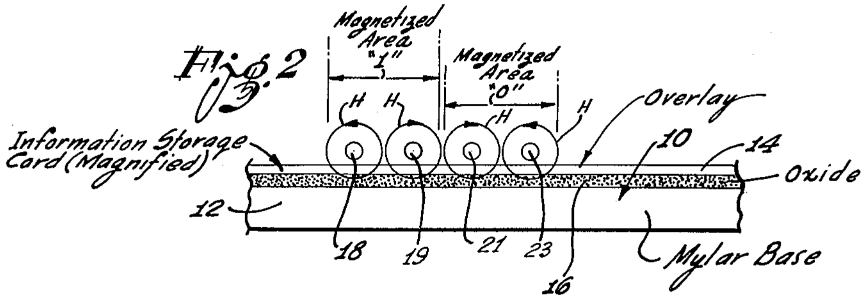
FIGURE 2 is a fragmentary side view of the card of FIGURE 1, also on an enlarged scale, this latter view showing the composition of a typical information storage card, and the view also showing diagrammatically the manner in which a magnetic coating on the card may be magnetized to present discrete areas representing binary "1" or binary "0"

A portion of a magnetic information storage card 10 of the type under consideration is shown enlarged in FIGURES 1, 1*a* and 2. This card may be of the type described and claimed in copending application Serial No. 758,517 which was filed September 2, 1958, in the name of George P. Walker and Jack W. Burkig. The card, as described in the copending application, includes a base or substrate 12 (FIGURE 2) having a generally rectangular configuration and measuring, for example, 1 inch by 3 inches. The base may have a thickness, for example, of 5 mils and it may be composed of "Mylar" laminate. The term "Mylar" is a trade name of the Dupont Company and is used by them to designate a polyethylene terephtholate material.

The information storage card 10 also includes a rectangular overlay 14 having the same dimensions as the base 12. The overlay may also be a "Mylar" laminate, and it may have a thickness, for example, of ½ mil.

Sandwiched between the base 12 and the overlay 14 is a layer 16 of suitable adhesive intimately mixed with a powdered magnetic substance, such as ferric oxide ($Fe_2O_3$). This adhesive-oxide layer may, for example, be of the order of .6 mil thick. The adhesive may be a polyester adhesive of the type presently being manufactured by the Dupont Company and presently being designated as their No. 4696 adhesive.

The card 10 may be prepared in the manner described in detail in the copending case Serial No. 758,517 referred to above. When so prepared, the oxide layer is capable of being magnetized into discrete magnetic areas to permit information to be recorded and stored on the card.

To construct a multi-element write head for the serial-serial Manchester method of recording compatible with high density requirements of the information storage cards under consideration requires extremely close spacing of the elements forming the transducing portion of the head. A graphic representation of the manner by which information is recorded on the information storage card 10 is shown in FIGURES 1, 1*a* and 2.

The information is recorded on the card 10 in a plurality of rows, such as the illustrated row 16, and these rows (as mentioned) extend parallel to one another lengthwise of the card. Each row includes a plurality of 8-bit characters for purposes of the present discussion. The bits which make up each character include a guard bit (A), a plurality of information bits (B–G) and a parity bit (H). The magnetized areas shown in FIGURE 1 representing the different bits are each, for example, .010 inch wide and .030 inch long.

It is clear that the usual prior art magnetic write heads are not practical for recording characters on an information storage card of the type shown in FIGURES 1, 1*a* and 2 without movement of the head with respect to the card to record successive bits. This is because of the extremely close spacing between the bits making up each character recorded on the card. The serial-serial Manchester type of recording, as described above, provides that a magnetized area representing a "1" bit, for example, have a first section with magnetization extending from north to south poles in a particular direction, as shown in FIGURE 1*a*. Conversely, a magnetized area representing a "0" bit would have magnetization extending from south to north in the particular direction.

The present invention provides a static write head in which a plurality of pairs of individual conductors are supported to extend across the different areas in FIGURE 1 in a direction transverse of the card. One conductor of each pair is disposed in one of the sections of the particular area (FIGURES 1*a* and 2) and the other conductor of that pair is disposed in the other section of the same area. The two conductors are interconnected by an integral loop at one end (FIGURE 4) and they are brought out to terminal connections at the other end. A voltage impressed across the two terminals of each pair of conductors causes a current flow across the corresponding area in one direction in one of the conductors and in the reverse direction in the other.

The plurality of pairs of conductors are provided in the write head of the invention, with one pair being designated for each bit of the character, so that a complete character and its guard bit and parity bit may be recorded for each operation. As the currents flow in the conductor pairs, the resulting magnetic field H (FIGURE 2) surrounding each conductor magnetizes the two sections of each bit area with one polarity sequence or another as determined by the polarity of the voltage introduced across the particular pair of conductors. The magnetic polarity sequence in each bit area may be controlled, therefore, so that a binary "1" or a binary "0" is recorded in that particular area. As shown in FIGURE 2, for example, a first pair of conductors 18 and 19 are supported by the write head to extend across one of the magnetic areas in the particular row being processed at that particular time. The current flow through these conductors is controlled so that the resulting magnetic fields produced by the forward current in one of the conductors and the reverse current in the other produces a N–S, S–N polarity sequence in that particular area. This, as shown in FIGURE 1*a*, is assumed to represent a binary "1." A second pair of conductors 21 and 23 is also supported by the write head of the invention to extend across the adjacent bit area. An opposite polarity may be introduced across these latter conductors, so that the current flow in them is opposite from the current flow in the pair 18 and 19. The resulting magnetic field surrounding the conductors 21 and 23 produces a S–N, N–S polarity sequence in the second area. This, as described in conjunction with FIGURE 1*a*, represents a binary "0." It will be understood that eight pairs of conductors are used in the write head under consideration, so that an entire character may be recorded on the card at any particular time.

The information storage card 10 may be carried by the transport medium in the card processing apparatus in a manner to be moved intermittently past the transducer head of the invention. This intermittent motion must be precisely controlled, so that the card is arrested for an interval long enough to receive the recordings corresponding to a particular character and so that the card may then be moved to a precisely located second position corresponding to the next character, and so on. At the completion of recording a row of characters on the card, the card may be shifted laterally and again brought into position to permit the recording of a second row. Conversely, a plurality of write heads may be used so that a corresponding plurality of rows of characters may be simultaneously recorded on each of the information storage cards.

The magnetic field strength about a conductor varies inversely with the distance from the center of the conductor. Therefore, for optimum field strength, conductors with an extremely thin section are used at the active recording surface of the write head embodying the invention.

The best possible manner of recording information on the information storage card would be by direct contact between the writing elements of the write head and the oxide magnetizing layer 15 of the card. However, the overlay 14 (FIGURE 2) holds the recording elements away from actual contact. Therefore, the current requirements of the head to saturate the magnetic areas of the oxide layer 15 are relatively high. It has been found that current requirements of the order of 15 amperes are required to produce such saturation. Since the oxide particles which make up the magnetic layer 15 of the card can be saturated in less than 1 microsecond and since the high current is necessary for writing, the current flow time through the conductors is limited to intervals of the order of 1 microsecond to avoid vaporizing the conductor.

The separate conductors which make up the write head must, as mentioned above, be very closely spaced. These conductors, in the embodiment of the invention to be described, are each of the order of .004 inch wide and the spacing between the conductors is held to .001 inch. Then printed circuit techniques are used to provide the conductors.

As shown in FIGURE 4, the conductors are formed on a thin flexible plastic film 20. The film may have a thickness of the order of .001–.002 inch. The conductors may be formed on the film 20 by known printed circuit techniques, and by using photo reduction methods. When the conductors have been formed on the film 20, with the configuration shown in FIGURE 4, the film 20 is cemented to a supporting wafer, or panel, 22 in FIGURE 3. The film 20 is cemented to the wafer in a position, as will be described, so that certain sections of the printed circuitry extend across the lower edge of the wafer in FIGURE 3, this lower edge forming an active transducer surface.

The conductors formed on the film 20 in FIGURE 4 are so formed, for example, by photo reduction printed circuit techniques, as mentioned above. In carrying out such a process, the circuit design may first be set out on an enlarged scale and photographed. The resulting negative is then reduced in size and placed over a copper foil which has been coated with a photo-sensitive resist. The photo-sensitive resist is exposed through the negative, and the exposed portions of the resist are dissolved off the foil. The unexposed resist remains on the foil and covers all portions of the foil except the portions corresponding to the reduced circuitry design, the latter poritons being left exposed. Silver may then be electro-plated on the exposed portions of the copper foil by usual electro-plating techniques, and the resulting silver deposit corresponds to the conductive design shown in FIGURE 4. The foil is then bonded to the plastic film 20 with the silver deposit in contact with the film. The copper may then be etched away, leaving the silver deposit on the film in the design shown in FIGURE 4.

As shown in the enlarged view of FIGURE 4, the circuitry design is such that a plurality of individual conductor pairs are provided. Each of these pairs includes a pair of terminal sections 24 and 26 which are integral with respective spaced narrow sections 28 and 30, the narrow sections being interconnected at their opposite ends by an integral loop section 32 (see particularly FIGURE 5*a*). The conductor pairs are arranged so that the terminal sections 24 and 26 in successive pairs extend on opposite sides of the center line of the assembly.

As noted above, the film 20 is then cemented, or otherwise affixed, to the supporting panel or wafer 22 in such a manner that the narrow sections 28 and 30 of each of the conductor pairs extend across the lower edge 36 of the wafer in spaced and parallel relationship. The supporting wafer 22 may be formed of any suitable flexible, thin, film-like insulating material such as a plastic material.

The resulting assembly consists of a flat insulating panel, or wafer, 22 formed of plastic material, such as a paper base phenol-laminate. This panel has an edge or surface 36 which forms an active transducer surface, and it has first and second faces disposed adjacent the edge. Notches 37 are provided in the faces of the wafer 22 at positions adjacent the surface 36 to facilitate the insertion of the wafer 22 into the assembly shown in FIGURES 6 and 7 and to facilitate the removal of the wafer from the assembly shown in FIGURES 6 and 7.

The printed circuitry is affixed to the flexible supporting film 20, which in turn is affixed to the wafer 22 in the manner described above, includes a plurality of current-carrying conductor elements. Each of these elements has a pair of narrow sections 28 and 30 which have a width small as compared with the width of the supporting member 22. These narrow sections 28 and 30 each extend across the edge 36. For alternate pairs, the terminal sections 24 and 26 are disposed on one face of the wafer 22, and the interconnecting loops 32 are disposed on the other face. For the pairs interposed between the alternate pairs, the terminal sections 24 and 26 are disposed on the other face of the wafer 22, and the interconnecting loops 32 are disposed on the first face, this configuration being shown in the enlarged fragmentary view of FIGURE 5*a*. Because of this configuration, only thin lines of conductive material extend across the edge or surface 36 defining the thickness of the wafer 32. The surface 36 has a relatively short width such as a width of approximately 0.030 inch.

With the construction described above, the introduction of a voltage across a particular pair of terminal sections 24 and 26 causes a current to flow in one direction through the corresponding narrow conductor section 28 and in the reverse direction through the corresponding narrow conductor section 30. Therefore, the introduced voltage can be controlled to set up the pairs of magnetic fields H shown in FIGURE 2, these field pairs having one polarity relationship when a binary "1" is to be recorded, and having a second polarity relationship when a binary "0" is to be recorded.

A suitable assembly for holding elements, such as the transducer element of FIGURE 3, is shown in FIGURES 6 and 7. This assembly is constructed so that the transducer element may be held in a releasable manner, with electrical contact being made to its terminal sections 24 and 26 by electrical conductors which are held against those terminal sections but which are not physically attached to them. This permits a simple and expeditious assembly, in that it permits simple and easy replacement of worn or damaged elements in the field. A suitable assembly for carrying out the concepts described above is shown in FIGURES 6 and 7.

The assembly illustrated in FIGURES 6 and 7 includes a first supporting panel 40 and a second supporting panel 42. These panels may be composed of a laminated phenolic material. The supporting panel 40 has a panel formed on its inner surface to receive the assembly of FIGURE 3. The assembly is held between the panels 40 and 42 with the active edge 36 protruding beyond these panels. This permits the assembly to be suitably mounted so that the active transducer surface may extend into contact with the overlay 14 of the information storage care 10 of FIGURE 1.

A further pair of supporting panels 44 and 46 are held adjacent the respective outer surfaces of the panels 40 and 42 in a sandwiched relationship. These latter panels may also be formed of laminated phenolic material, and they are apertured in the illustrated manner, for reasons to be described. A pair of outer housing members 48 and 50, having the illustrated configuration, are supported adjacent the outer surfaces of respective ones of the supporting panels 44 and 46. The housing members 48 and 50 may also be composed of laminated phenolic.

A plurality of electric terminals 52 are supported on the member 48 in the illustrated position, and a similar plurality of electric terminals 54 are supported on the member 50. The terminals 52 are formed into a plurality of pairs, with each pair intended to make electric contact with a corresponding pair of terminal sections 24 and 26 on one side of the wafer 22 in FIGURE 3. Likewise, the terminals 54 are also arranged in pairs and each pair is intended to be established in electric contact with a corresponding pair of terminal sections 24 and 26 on the opposite face of the wafer 22.

The electrical connections from the terminals 52 and 54 to the respective terminal sections 24 and 26 on the wafer 22 are established by resilient metallic strip connector members 56. These strip members may be composed, for example, of beryllium copper. These strip members extend into channels formed in the inner surface of the member 48, and into similar channels formed on the inner surface of the member 50.

As illustrated in FIGURE 7, a pair of the resilient connectors **56*a* and 56*b* extend into corresponding channels 58*a* and 58*b* in the support member 48, and are attached to the corresponding one of the terminals 52, for example, by swedging or welding. Conductive contacts 60 composed, for example, of silver are attached to the other ends of respective ones of the resilient strip connector members 56. These contacts 60 extend through apertures in corresponding ones of the supporting panels 42 and 44 and through the supporting panels 44 and 46. The contacts 60 engage respective ones of the terminal sections 24 and 26 on the wafer 22**.

A plurality of screw and nut assemblies 62, 63, 64, 65, 66, 67, 68, 69 extend through the assembly to hold the unit in an assembled position. As the nut and screw assemblies are tightened, the electrical connector strips 56 force their respective contacts 60 into a firm electrical contact with the respective terminal sections 24 and 26. In this manner, electrical contact is established between the terminals 52 and 54 and the terminal sections on the wafer 22. The connection is established without the need for any physical attachment to the latter terminal sections. This means that the wafer assembly may be removed from the unit of FIGURES 6 and 7, merely by loosening the screw and nut assemblies and without the need for any particular electrical disconnect operations.

Initial alignment may be made between the various sections of the assembly in FIGURES 6 and 7 by means of appropriate dowel pins 72 and 74 which extend through the various support members and which are attached, for example, to the support member 50.

The invention provides, therefore, an improved and unique electro-magnetic transducer. The described embodiment of the invention is in the form of a transducer head, preferably a write head, in which a plurality of current-carrying elements extending transversely of the recording medium are used to create the required recording magnetic fields. These elements are formed, for example, by printed circuit techniques to have an extremely small section and mutual spacing. The conductors are supported in a convenient manner so that electrical connections may be made to them. Moreover, and as described above, the improved housing for the transducer elements of the invention also has an improved construction, in that it permits the elements to be supported in a manner by which they may be conveniently removed and replaced.

What is claimed is:

1. A transducer assembly for use with a recording medium, including: a flat panel having an edge disposed in contiguous relationship to the recording medium for providing an active transducer surface and having a first face and a second face disposed adjacent the edge, a current-carrying element having a terminal portion affixed to said first face of the flat panel and having at least one narrow section extending across said edge of the panel, a first supporting member disposed to engage the first face of the panel, a second supporting member disposed to engage the second face of the panel, means operatively coupled to the first and second supporting members for holding said first and second supporting members against said first and second faces of the panel with the panel sandwiched therebetween and with said edge thereof protruding beyond said supporting members, terminal means mounted on at least one of the supporting members, and electrical connecting means extending from the terminal means and engaging the terminal portion of the current-carrying element for electrical contact therewith in accordance with the forces exerted by said holding means.

2. A transducer assembly including: a flat panel having an edge for forming an active transducer surface and having a first face and a second face disposed adjacent the edge, a plurality of current-carrying elements each having a terminal portion affixed to respective ones of said first and second faces of the panel and each having at least one narrow section extending across said edge of the panel, a first flat supporting member disposed to engage the first face of the panel, a second flat supporting member disposed to engage the second face of the panel, means operatively coupled to the first and second supporting members for holding the first and second supporting members against said first and second faces of the panel with the panel sandwiched therebetween and with said edge thereof protruding beyond said supporting members, a plurality of terminals mounted on at least one of said supporting members, and a corresponding plurality of electrical connectors extending from respective ones of the terminals into positions and engaging corresponding ones of the terminal portions of the current-carrying elements for electrical contact therewith in accordance with the forces exerted by the holding means.

3. The assembly set forth in claim 2 in which each current-carrying element includes a pair of spaced narrow sections extending across the edge of the panel in contiguous relationship to each other and in which the pair of narrow sections in each current-carrying element are joined by a looped portion on one of the first and second faces of the flat panel.

4. An electro-magnetic transducer for use with a recording medium including:

a thin flat supporting member made from a non-magnetic material and having a thin surface disposed in contiguous relationship to the medium for providing a thin transducer surface and further having a first face adjacent the thin surface on one side thereof and having a second face adjacent the thin surface on the other side thereof and defining the thin surface between the first and second faces, and at least one current-carrying element having a pair of terminal portions affixed to said first face of the flat supporting member and having a pair of spaced narrow sections extending across said thin surface of the supporting member in contiguous relationship to each other and to the medium and having a loop portion affixed to said second face and interconnecting said narrow sections.

5. The combination defined in claim 4 and which includes a plurality of such current-carrying elements disposed in side-by-side relationship along the thin surface of said supporting member and which further includes first and second means respectively disposed against the first and second faces of the supporting member and supporting the supporting member with the thin surface projecting beyond the first and second means in contiguous relationship to the recording medium.

6. An electro-magnetic transducer for use with a recording medium, including:

a supporting member made from a non-magnetic material and having a thin surface disposed in contiguous relationship with the recording medium for providing an active transducer surface and further having at least one face disposed adjacent the thin surface, printed circuitry affixed to the supporting member and including at least one current-carrying element having first and second spaced narrow sections extending across said thin surface of the supporting member in contiguous relationship to each other and having a connecting portion on the face of the supporting member, first supporting means disposed against the first face of the supporting member in displaced relationship to the thin surface of the supporting member to maintain the thin surface in contiguous relationship to the recording medium, terminal means mounted on the first supporting means, and electrical connecting means electrically coupling the terminal means to the current-carrying element.

7. An electro-magnetic transducer for providing a transducing action with an information member constructed to receive information in magnetic form, the transducer including:

a thin sheet made from insulating material and having a thin film of electrically conducitve material disposed on the sheet, the thin film of electrically conductive material being provided with a thin portion at one position and being provided with a second portion communicating with the thin portion and having a dimension of increased thickness relative to the thin portion, a wafer made from insulating material and having a thin surface and a pair of faces communicating with and defining the thin surface, the thin sheet being attached to the wafer with the thin portion of electrically conductive material extending across the thin surface of the wafer for magnetic coupling to the information member and with the second portion of electrically conductive material disposed against a first one of the pair of faces on the wafer, and first and second supporting means disposed against individual ones of the pair of faces on the wafer to retain the wafer between the first and second supporting means, the first and second supporting means retaining the wafer with the thin surface of the wafer projecting from the supporting means in contiguous relationship with the information member.

8. The transducer set forth in claim 7 wherein a third portion of electrically conductive material is disposed against the second one of the pair of faces on the wafer and is electrically continuous with the thin and second portions of the electrically conductive material and wherein electrically conducitve terminal means extend from the second supporting means to the third portion of the electrically conductive material to provide electrical connections to the third portion.

References Cited in the file of this patent

UNITED STATES PATENTS

| | | |
|---|---|---|
| 2,680,156 | Thorenson | June 1, 1954 |
| 2,722,676 | Begun | Nov. 1, 1955 |
| 2,838,614 | Ashby | June 10, 1958 |
| 2,841,461 | Gleason | July 1, 1958 |
| 2,900,451 | Havstad | Aug. 18, 1959 |
| 2,927,973 | De Geller | Mar. 8, 1960 |